United States Patent
Gath et al.

(10) Patent No.: US 10,727,496 B2
(45) Date of Patent: *Jul. 28, 2020

(54) FUEL CELL OXIDATION REDUCTION REACTION CATALYST

(71) Applicant: FORD GLOBAL TECHNOLOGIES, LLC, Dearborn, MI (US)

(72) Inventors: Kerrie K. Gath, Pittsfield, MI (US); Zijie Lu, Novi, MI (US); Chunchuan Xu, Troy, MI (US); Jun Yang, Bloomfield Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 736 days.

This patent is subject to a terminal disclaimer.

(21) Appl. No.: 15/210,217

(22) Filed: Jul. 14, 2016

(65) Prior Publication Data

US 2018/0019479 A1  Jan. 18, 2018

(51) Int. Cl.
  *H01M 4/86* (2006.01)
  *H01M 4/92* (2006.01)
  *H01M 4/88* (2006.01)

(52) U.S. Cl.
  CPC ......... *H01M 4/926* (2013.01); *H01M 4/8657* (2013.01); *H01M 4/8867* (2013.01); *H01M 4/8652* (2013.01); *H01M 4/8875* (2013.01); *H01M 4/928* (2013.01)

(58) Field of Classification Search
  CPC .. H01M 4/926; H01M 4/8871; H01M 4/8657; H01M 4/8867; H01M 4/8652; H01M 4/8875; H01M 4/928
  See application file for complete search history.

(56) References Cited

U.S. PATENT DOCUMENTS

| 8,309,489 | B2 | 11/2012 | Roldan Cuenya et al. |
| 9,099,751 | B2 | 8/2015 | Hays et al. |
| 2013/0059232 | A1 | 3/2013 | Jung et al. |
| 2014/0178792 | A1 | 6/2014 | Yang et al. |
| 2014/0356765 | A1* | 12/2014 | Pietrasz ............... H01M 4/925 429/524 |
| 2015/0375208 | A1 | 12/2015 | Yang et al. |

OTHER PUBLICATIONS

Zhang, Li, et al. "Highly corrosion resistant platinum-niobium oxide-carbon nanotube electrodes for the oxygen reduction in PEM fuel cells." Energy & Environmental Science 5.3 (2012): 6156-6172. (Year: 2012).*

Sasaki, K., L. Zhang, and R. R. Adzic. "Niobium oxide-supported platinum ultra-low amount electrocatalysts for oxygen reduction." Physical Chemistry Chemical Physics 10.1 (2008): 159-167. (Year: 2007).*

Kong, Lingping, et al. "Nanoarchitectured Nb 2 O 5 hollow, Nb 2 O 5@ carbon and NbO 2@ carbon core-shell microspheres for ultrahigh-rate intercalation pseudocapacitors." Scientific reports 6 (2016): 21177. (Year: 2016).*

* cited by examiner

*Primary Examiner* — Milton I Cano
*Assistant Examiner* — Philip A. Stuckey
(74) *Attorney, Agent, or Firm* — David B. Kelley; Brooks Kushman P.C.

(57) ABSTRACT

A fuel cell oxidation reduction reaction catalyst includes a carbon powder substrate, an amorphous conductive metal oxide intermediate layer on the substrate, and a plurality of chained electrocatalyst particle strands bound to the layer to form an interconnected network film thereon having a thickness of up to 10 atom monolayers.

20 Claims, 5 Drawing Sheets

FUEL CELL OXIDATION REDUCTION REACTION CATALYST

TECHNICAL FIELD

The disclosure relates to a fuel cell oxidation reduction reaction (ORR) cathode catalyst and a method of producing the same.

BACKGROUND

Fuel cells, such as proton exchange membrane fuel cells (PEMFC), represent an attractive source of electricity due to zero-emissions generation and increased energy security. Among the primary components of each fuel cell are two electrodes and an ion conducting electrolyte. The design of the electrodes requires delicate optimization of materials and production processes to ensure good conductance of gas, electrons, and protons such that the resultant electrode is efficient, not prone to flooding, and does not overly deteriorate during use. To improve its catalytic function, it is desirable to include an ORR catalyst onto the cathode. To deposit the catalyst, various solution-based methods including chemical vapor deposition have been developed.

SUMMARY

In at least one embodiment, a fuel cell oxidation reduction reaction catalyst is disclosed. The catalyst may include a carbon powder substrate. The catalyst may further include an amorphous conductive metal oxide intermediate layer on the substrate. The catalyst may additionally include a plurality of chained electrocatalyst particle strands bound to the layer to form an interconnected network film thereon having a thickness of up to 10 atom monolayers. The chained electrocatalyst particle strands may include platinum. The electrocatalyst loading associated with the chained electrocatalyst particle strands may be about 5 wt. % to 30 wt. %. The end of life mass activity of the electrocatalyst after 25,000 cycles associated with the chained electrocatalyst particle strands may be about 150 A/g to 200 A/g. The intermediate layer may have an irregular shape with an uneven surface. The metal oxide may be NbOx. The carbon powder substrate may include graphene flakes.

In another embodiment, a fuel cell oxidation reduction reaction catalyst is disclosed. The catalyst may include a carbon powder substrate. The catalyst may further include a plurality of chained electrocatalyst particle strands. The particle strands may be bound to the carbon powder substrate to form an interconnected network film thereon having a thickness of up to 10 atom monolayers. The chained electrocatalyst particle strands may include platinum. The electrocatalyst loading associated with the chained electrocatalyst particle strands may be about 5 wt. % to 30 wt. %. The end of life mass activity of the electrocatalyst after 25,000 cycles associated with the chained electrocatalyst particle strands may be about 150 A/g to 330 A/g. The carbon powder substrate may include graphene flakes.

In yet another embodiment, a method of preparing a fuel cell oxidation reduction reaction catalyst is disclosed. The method may include, within a vacuum chamber, mixing a carbon powder substrate in a side-oriented rotating fluidization drum such that the substrate repeatedly travels toward a top of the drum and then falls to a bottom of the drum. The method may further include vacuum depositing the electrocatalyst particles onto the falling substrate to form chained electrocatalyst particle strands bound to the substrate. The drum may be rotating at a speed of about 1-15 rpm. Vacuum depositing the electrocatalyst particles onto the falling substrate may be conducted until the chained electrocatalyst particle strands bound to the substrate form a layer having a thickness of up to 10 atom monolayers. The chained electrocatalyst particle strands may include platinum. The electrocatalyst loading associated with the chained electrocatalyst particle strands may be about 5 wt. % to 30 wt. %. The end of life mass activity of the electrocatalyst after 25,000 cycles associated with the chained electrocatalyst particle strands may be about 150 A/g to 200 A/g. The carbon powder substrate may include irregularly shaped metal oxide particles having an uneven surface.

In an additional embodiment, a method of producing a fuel cell oxidation reduction reaction catalyst is disclosed. The method may include, within a vacuum chamber, delivering a carbon powder substrate on a conveyor such that the substrate repeatedly travels toward a top of the conveyor and then falls to a bottom of the conveyor. The method may further include vacuum depositing electrocatalyst particles onto the falling substrate to form chained electrocatalyst particle strands bound to the substrate.

DETAILED DESCRIPTION

Figure 1:
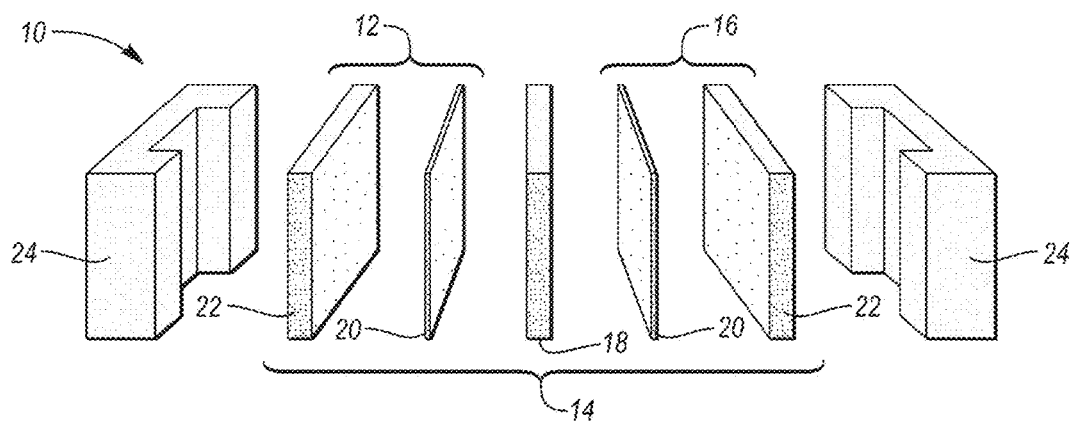
FIG. 1 depicts an exploded schematic view of an example fuel cell unit according to one or more embodiments.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Fuel cells are devices converting chemical potential energy from a fuel, usually hydrogen, into electrical energy through a chemical reaction of the fuel with oxygen or another oxidizing agent. Fuel cells are capable of producing electricity as long as they have a continuous source of the fuel and oxygen. Many different types of fuel cells have been developed and are being utilized to power a plethora of different vehicles. Exemplary types of fuel cells include PEMFCs, phosphoric acid fuel cells (PAFCs), alkaline fuel cells (AFCs), solid oxide fuel cells (SOFCs), direct methanol fuel cells (DMFCs), molten carbonate fuel cells (MCFCs), etc.

Every fuel cell includes one or more stacks of individual units 10 having several components which are adjacent to each other. An example fuel cell unit 10 is depicted in FIG. 1 and includes an anode 12, a membrane electrode assembly (MEA) 14, and a cathode 16. An electrolyte is present, carrying electrically charged particles between the two electrodes 12, 16. Typically, MEA 14 includes a polymer electrolyte membrane (PEM) 18, two catalyst layers 20, and two gas diffusion layers (GDL) 22. The fuel cell unit 10 further includes an end or bipolar plate 24 on each side.

As a pressurized fuel enters the fuel cell on the anode side 12, the fuel undergoes oxidation reactions resulting in positively charged hydrogen ions and electrons. The positively charged hydrogen ions travel through the electrolyte while the electrons are forced to travel from the anode 12 to the cathode 16 via an external circuit, producing direct current electricity. If alternating current is needed, the direct current output may be routed through an inverter. Oxygen enters the cathode 16, combines with electrons returning from the electrical circuit and the hydrogen ions. Alternatively, depending on the type of electrolyte used, the oxygen combined with the electrons may travel through the electrolyte and combine with hydrogen ions at the anode 12. Regardless of the location where oxygen and hydrogen ions combine, together they form water, which is removed from the fuel cell.

The anode 12 and the cathode 16 each include a catalyst layer 20 facilitating the reactions of oxygen and hydrogen. At the anode 12 of a PEMFC, a catalyst oxidizes the fuel into the hydrogen protons and electrons. The cathode catalyst catalyzes oxygen reduction reaction (ORR) which results in formation of water. The chemical reactions at the cathode 16 have a more complicated reaction mechanism than the reactions at the anode 12. As a result, the reactions at the cathode 16 are slow and require a substantial amount of catalyst to increase the speed of the reaction. A desirable catalyst must be sufficiently chemically active to be able to activate $O_2$, yet stable enough to withstand the corrosive environment at the cathode 16. Further still, the catalyst layer must be capable of facilitating release of product water from the catalyst surface to free up catalytic sites once the reaction is complete. Additionally, the catalyst must be selective enough to produce the desired product while minimizing production of undesirable intermediates. Thus, typically, the cathode 16 requires a higher catalyst loading than the anode 12.

If a noble metal such as platinum is used as a catalyst, the effective amount required may be ten times higher at the cathode 16 than at the anode 12. While other materials may be used as a catalyst, platinum offers several advantages. For example, platinum is one of the few elements capable of withstanding the acidic environment of the fuel cell. On the cathode 16, platinum has the highest activity of all bulk metals. During the preferred ORR mechanisms, platinum binds first to $O_2$ and then the OH. On the platinum surface, the O=O bond is usually broken on adsorption so that the reaction mechanism can proceed according to the desired dissociate mechanism with minimal production of $H_2O_2$ which typically results when $O_2$ is adsorbed on a metal surface without the O=O bond being broken. Platinum thus helps prevent presence of free $H_2O_2$ which may be otherwise highly damaging in the fuel cell environment.

Additionally, at the anode 12, platinum oxidizes hydrogen gas faster at any given potential than other catalyst materials. Hydrogen gas adsorbs to platinum molecules, the H—H bond breaks, and two H—Pt bonds form. Removal of electrons from each hydrogen atom follows at the anode. The bond between H—Pt has an optimal strength. Metals having weaker interactions with hydrogen gas are less efficient as the adsorption of hydrogen gas to the metal. On the other hand, metals which may bind hydrogen to the metal too strongly may not efficiently release the electrons and the positively charged hydrogen ions. Because of the nature of the catalysts, the type of catalyst used may significantly affect the cost of the fuel cells. Thus, it would be desirable to provide a method which would enable deposition of the electrocatalyst in such a way that the electrocatalyst is highly active and durable even at a lower catalyst loading such that the costs associated with its application are minimized.

Typically, a solution-based or wet-chemical method is used to deliver a fuel cell electrocatalyst powder onto a substrate. The powder is then processed into an ink which is coated onto a GDL 22 which is used to help remove water on the cathode side 16 while delivering the hydrogen to the anode side 12 and oxygen to the cathode side 16. The solution-based method, however, may result in an uneven distribution of the metal particles onto the substrate. Additionally, the electrocatalyst delivered by the wet-chemical method typically forms agglomerations. The agglomerations are responsible for the high electrocatalyst loading as at least some of the individual atoms within the agglomerations are not being utilized. Additionally still, wet-chemical methods utilize chemistry such as chloroplatonic acid which may be incompatible with efforts to provide environmentally conscious fuel cell solutions.

A similar agglomeration of the electrocatalyst particles is formed using traditional PVD methods due to the poor dispersion of carbon particles. PVD is a general term describing a number of vacuum deposition methods used to produce thin films. PVD involves condensation and evaporation of material and an atom-by-atom transfer of the material from the solid phase to the vapor phase and back to the solid phase. PVD produces a vapor of the solid material by heating or sputtering. The vaporized material is then transferred from the source to a substrate by line-of-sight, molecular flow, or vapor ionization by creating plasma. The vaporous phase is then deposited onto the substrate. The process may be repeated to form a number of layers of the deposited material. PVD is carried out at temperatures of about 0° C. to 1000° C. Example PVD methods include cathodic arc deposition, electron beam PVD, sputter deposition including pulse DC sputtering, DC sputtering, radiofrequency sputtering, and ion-specific sputtering, evaporative deposition, and pulsed laser deposition. During the traditional PVD methods, metal particles are delivered onto a substrate under a right angle.

Figure 2A:
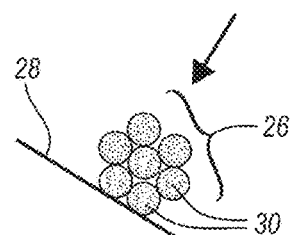
FIG. 2A depicts a schematic agglomeration of electrocatalyst particles deposited onto a substrate by a typical right-angle physical vapor deposition (PVD) method.
Figure 2B:
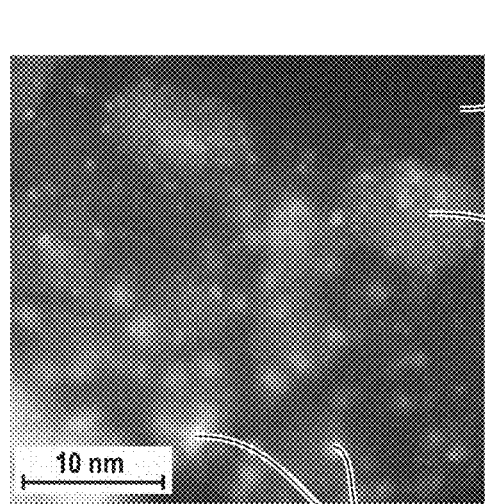
FIGS. 2B and 2C are dark-field scanning transmission electron microscope (STEM) photographs of a substrate with electrocatalyst particles deposited thereon by a typical right-angle PVD method.
Figure 2C:
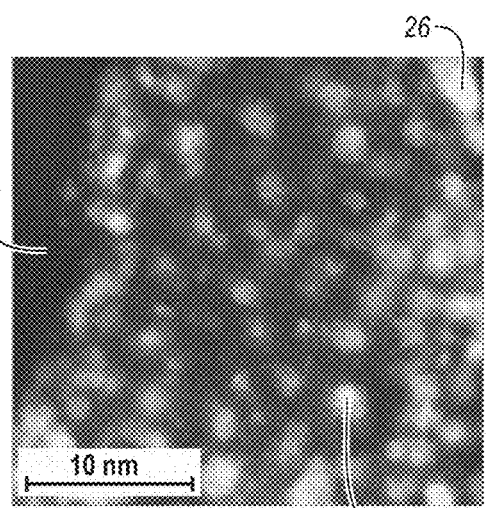

A schematic agglomeration 26 formed by the traditional PVD method is depicted in FIG. 2A. As FIG. 2A depicts, the agglomeration 26, or a cluster of electrocatalyst atoms, is attached to a substrate 28. FIGS. 2B and 2C provide darkfield STEM photographs of a substrate 28 with electrocatalyst particles 30 sputtered thereon using a traditional PVD method referenced above. In FIGS. 2B and 2C, and all other STEM photographs discussed herein, the black color represents the carbon substrate 28, the gray color represents metal or metal oxide 32, and the white color represents the electrocatalyst particles 30. As can be seen in FIGS. 2B and 2C, the particles 30 are concentrated into clusters or agglomerations 26 which are not interconnected.

The agglomerations 26 contain at least a portion of electrocatalyst particles 30 which are inactive as they are within the agglomeration 26 and thus are unavailable to utilize their catalytic properties. The electrocatalyst loading of the catalyst is thus relatively high because not all electrocatalyst particles are able to participate in the catalytic reactions. Furthermore, the amount and/or size of the agglomerations 26 may increase in time as the electrocatalytic particles 30 have an increased tendency to aggregate into larger particles over time when the fuel cell is being used or when carbon monoxide attaches to their surface. The agglomerations 26 thus contribute to the loss of the electrocatalyst efficiency.

The embodiments of the current disclosure overcome one or more above-named disadvantages. In one or more embodiments, a fuel cell ORR catalyst 20 is disclosed. The catalyst 20 includes a substrate 28, an amorphous conductive metal and/or metal oxide layer 32 attached to the substrate 28, or both, and a plurality of chained electrocatalyst particle strands 34 bound to the intermediate layer 32, to the substrate 28, or both. The catalyst 20 is depicted in FIGS. 3A-3H.

Figure 3A:
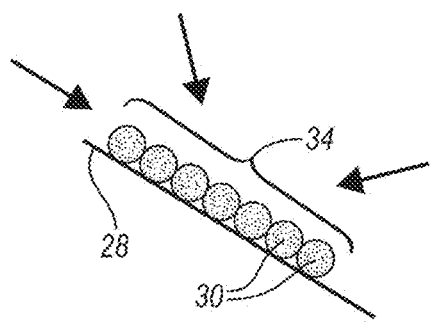
FIG. 3A depicts a schematic chained electrocatalyst particle strand deposited onto a substrate by a PVD on fluidized substrate method.
Figure 3B:
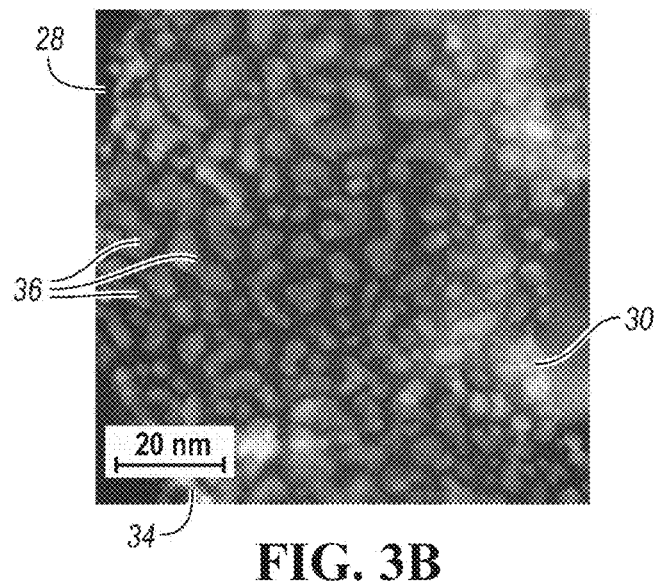
FIGS. 3B-3H represent dark-field STEM photographs of a substrate with electrocatalyst particles deposited thereon by a PVD on fluidized substrate method.
Figure 3C:
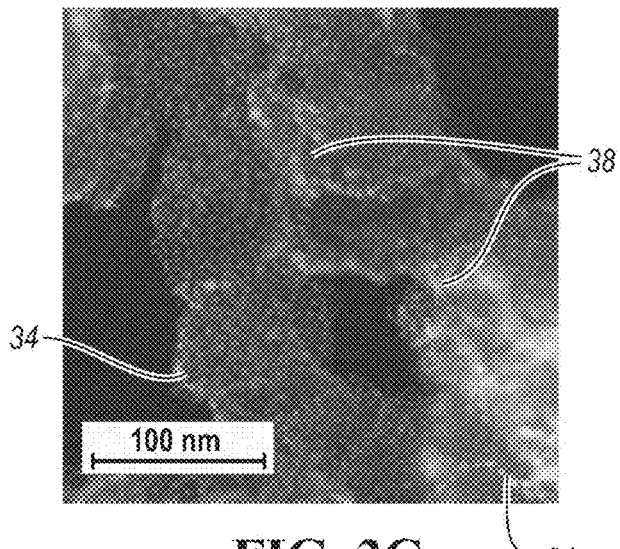
Figure 3D:
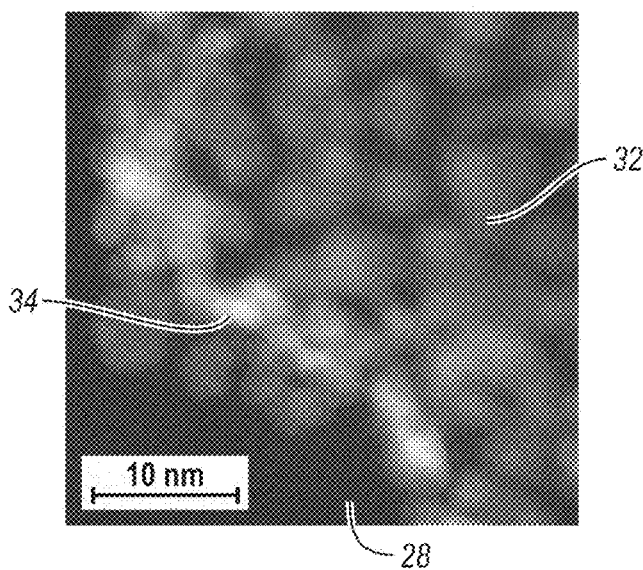
Figure 3E:
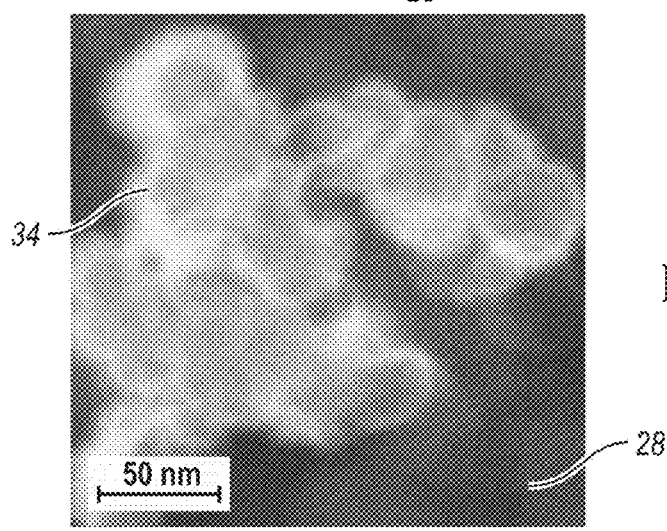
Figure 3F:
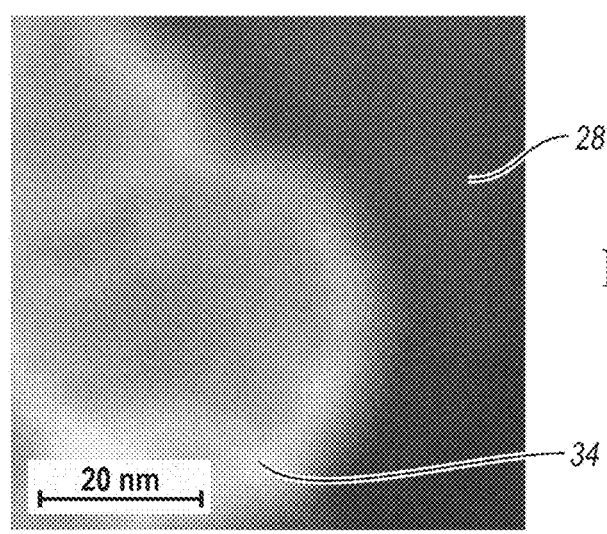
Figure 3G:
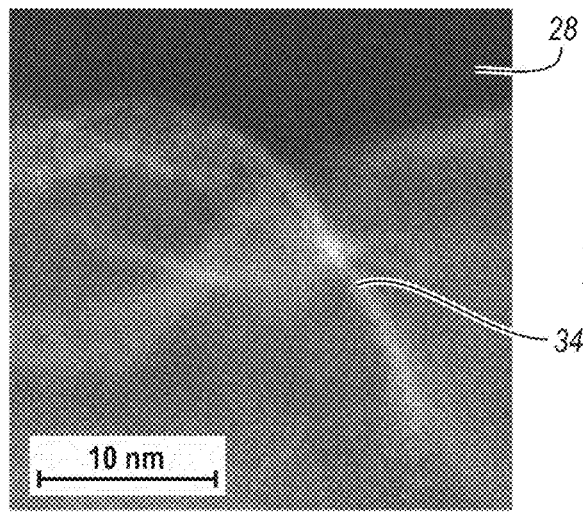
Figure 3H:
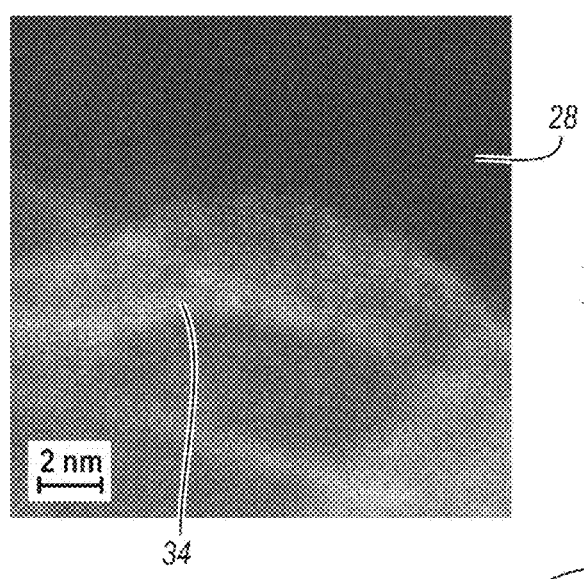

FIG. 3A depicts a schematic chained electrocatalyst particle strand 34 deposited onto a substrate 28 by a method disclosed herein. FIGS. 3B-3H are dark-field STEM photographs illustrating formation of the chained electrocatalyst particle strands 34 on a substrate 28, an intermediate layer 32, or both, as will be discussed below.

The substrate 28 may be any base material capable of providing support for the electrocatalyst 30, the metal and/or metal oxide 32, or both and being suitable for a fuel cell. The substrate 28 may be a carbon fiber support. The substrate 28 may be a composite support such as graphite, carbon nanofibers, macromolecules, the like or a combination thereof. The substrate 28 may include members of the fullerene structural family such as carbon nanotubes, nanospheres, nanoellipsoids, the like, or a combination thereof. The substrate 28 may include a honeycomb lattice structure or a three-dimensional graphene material having periodic and nonperiodic honeycomb-like portions. The substrate may include graphene flakes. The substrate may include a network of carbon fibers. The substrate 28 may be a carbon fiber paper, a carbon fiber cloth, a carbon nanotube sheet, a carbon nanotube yarn, a carbon nanotube tape, or the like, having a pore size of about 50 nm to 10 µm, 5 nm to 500 nm, or 1 nm to 200 nm. The substrate material may have a diameter of 50 nm to 1 µm, 10 nm to 500 nm, or 0.7 nm to 200 nm. The surface area of the substrate 38 may be from about 200 $m^2/g$ to 5,000 $m^2/g$. The substrate 28 should be lightweight, strong, and porous enough to allow gas and water vapor to pass through to the catalyst layer 20.

Metal or metal oxides may be included as a metal oxide layer or an intermediate layer 32 and attached to the substrate 28. Specifically, the intermediate layer 32 may be included to improve geometry of the catalyst 20, prevent disintegration of the catalyst structure, as well as assist in ensuring that the electrocatalyst nanoparticles 30 do not form aggregations 26 or that a formation of the aggregations 26 is minimized prior to utilization of the fuel cell.

The intermediate layer 32 may further improve catalytic activity of the cathode 16. The metal or metal oxide may be distributed on top of the carbon substrate to enhance the formation of the electrocatalyst particle 30 network. The intermediate layer 32 may form a layer between the substrate 28 and the electrocatalyst particles 30. The intermediate layer 32 may be arranged in the same plane as the electrocatalyst particles 30. The electrocatalyst particles 30 may be thus attached to the metal or metal oxide of the intermediate layer 32, the atoms of the substrate 28, or both. The electrocatalyst particles 30 may be deposited on the intersections of the carbon atoms of the substrate 28 and the metal or metal oxide such that the electrocatalyst particles 30 may be attached to both the carbon atoms and the metal or metal oxide. Alternatively, the metal or metal oxide may function as a barrier between the carbon substrate and the electrocatalyst particles 30. Alternatively still, the metal or metal oxide may be deposited between at least some monolayers of the electrocatalyst particles 30. The metal or metal oxide may be deposited onto the substrate 28 prior to deposition of the electrocatalyst particles 30 or be co-deposited with the electrocatalyst particles 30.

The intermediate layer 32 may include metal or metal oxide such as cobalt, manganese, nickel, rhodium, ruthenium, gold, niobium, titanium, tantalum, molybdenum, tungsten, iridium, the like, their combination, or any other metal compatible with fuel cell use. The amount of the metal or metal oxide within the intermediate layer 32 may be from about 0.05 $mg/cm^2$ to 3 $mg/cm^2$, 0.5 $mg/cm^2$ to 2 $mg/cm^2$, or 0.2 $mg/cm^2$ to 1 $mg/cm^2$ of the substrate.

The intermediate layer 32 may be continuous or discontinuous. The metal or metal oxide may be amorphous and form a variety of structures. For example, the intermediate layer 32 may include individual formations 36 of the metal or metal oxide attached to the carbon substrate 28 such that the intermediate layer 32 has a non-uniform shape and/or an uneven surface. The uneven surface refers to a surface which is not level, flat, or smooth, does not follow a regular pattern, and may not be the same in all of its portions. The formations 36 may have an elongated, curved arrangement. Each formation 36 may have different dimensions, shape, configuration, and/or orientation than other formations 36. The formations 36 may form individual island-like structures or blobs within the intermediate layer 32.

The electrocatalyst particles 30 deposited on the substrate 28, the intermediate layer 32, or both are metallic nanoparticles. The electrocatalyst particles 30 serve as an electrocatalyst in the fuel cell cathode 16. The electrocatalyst particles 30 provide the ORR catalytic function. The electrocatalyst particles 30 may be platinum, platinum alloys, platinum oxides, or a combination thereof. The electrocatalyst particles 30 may include about 5% to 100% platinum, 15% to 70% platinum, or 20% to 50% platinum. The platinum alloys may be a combination of platinum and any element formed into nanoparticles with controllable size as long as the electrocatalyst particles 30 retain their catalytic activity. The alloying element may be less expensive than platinum. Desirable alloying materials provide access of the sub-platinum atoms to the surface of the alloyed particles such that platinum is available to promote the key reactions in the fuel cell. Example elements may include yttrium, carbon, cobalt, manganese, rhodium, ruthenium, gold, niobium, titanium, tantalum, molybdenum, tungsten, iridium, the like, or their combination.

The electrocatalyst particles 30 are deposited onto the substrate 28 and/or the metal oxide layer 32 in such a way that at least some of the electrocatalyst particles 30 form a plurality of chained electrocatalyst particle strands 34 bound to the intermediate layer 32 and/or the substrate 28. The strands 34 include a series of electrocatalyst particles 30 which are connected to each other in a linear fashion. The particles 30 form chain-like or string-like structures, which are depicted in the FIGS. 3B-3H in white color. Within the chain-like structures, two adjacent particles 30 are deposited in such close proximity to each other that they are in contact with each other. The strands 34 may have a different length, number of electrocatalyst particles, orientation, or a combination thereof. The strands 34 may be linear or branched. The strands 34 may be elongated, forming a line. The line may be straight or contain one or more curves.

The chained electrocatalyst particle strands 34 may form a network 38. The network 38 may be a continuous network. Alternatively, the network 38 may include one or more gaps or be partially discontinuous. The network 38 may be two-dimensional such that the electrocatalyst particles 30 may form one or more monolayers. The amount of monolayers may be about 1 to 10. A higher amount of monolayers is contemplated but may not be needed as the present method provides an increased efficiency of the catalyst at lower electrocatalyst loading. Thus, 1 to 10 monolayers deposited by the presently disclosed method may result in a more active and efficient catalyst than a catalyst, prepared via a traditional deposition method referenced above, containing more than 10 monolayers of an electrocatalyst.

A single monolayer or a plurality of monolayers may be deposited onto the carbon substrate 28 and/or the intermediate layer 32. A monolayer is a one-atom thick layer of interconnected electrocatalyst particles 30. The interconnected network 38 provides structural stability as bond bridges are formed between the strands 34, the electrocatalyst particles 30, or both. The particles 30 are thus anchored at the deposition site. The bonds between the electrocatalyst particles 30, the strands 34, the intermediate layer 32, the substrate 28, or a combination thereof may be physical, mechanical, chemical, or a combination thereof. Regardless of the type of the bond, the interconnections between the electrocatalyst particles 30, the strands 34, the intermediate layer 32, the substrate 28, or a combination thereof ensure that the electrocatalyst particles 30 are being held in place and that the particles 30 are not being detached. The entire network 38 is more stable and does not dissolve as fast as a substrate 28 with agglomerations 26 of the electrocatalyst particles 30. The network 38 may form a thin film on the substrate 28, the intermediate layer 32, or both.

The size of the electrocatalyst particles 30 may be from about 1 nm to 15 nm, 2 nm to 9 nm, or 5 nm to 7 nm in diameter. The size of the electrocatalyst particles 30 has to be sufficient to provide active surface area large enough to sustain electrochemical activity. The length of the chained electrocatalyst particle strands 34 may be from about 7 nm to 200 nm, 20 nm to 150 nm, or 30 nm to 100 nm. The electrocatalyst particles 30 may be capable of producing up to about 3.0 A of electric current/g of platinum. The density of the electrocatalyst particles 30 deposited onto the substrate 28, the intermediate layer 32, or both may be from about 0.1 mg/cm$^2$ to 1 mg/cm$^2$, 0.05 mg/cm$^2$ to 0.6 mg/cm$^2$, or 0.02 mg/cm$^2$ to 0.3 mg/cm$^2$. The density of the electrocatalyst particles 30 may be the same or different throughout respective monolayers of the electrocatalyst particles 30. The density may be tailored. For example, the monolayers arranged closest to a fuel cell membrane 18 may have the lowest density. The opposite arrangement is also possible such that the monolayers closest to the membrane 18 have lower density of the electrocatalyst particles 30 and higher content of ionomer (not depicted) to increase proton conductivity.

A higher content of the electrocatalyst particles 30 in a monolayer adjacent to a GDL 22 may increase electrical conductivity. Alternatively, each monolayer may have the same density, or only several monolayers may have the same density of the electrocatalyst particles 30. The density of the electrocatalyst particles 30 in the cathode 16 may gradually decrease in a direction away from or towards a GDL 22. The electrocatalyst particles 30 may be diffusively spread such that their spatial distribution within a monolayer is regular. In comparison to a wet chemical-deposited electrocatalyst material, the electrocatalyst particles 30 of the current disclosure are dispersed in a more uniform manner. The ionomer content may be diffusively spread such that the spatial distribution of the ionomer within the substrate 28 is regular, or may gradually decrease in a direction away from the PEM 18, in a multilayer electrode structure, ensuring high proton conductivity in the cathode 16.

The loading of the electrocatalyst particles 30 in the chained electrocatalyst particle strands 34 is about 5 wt. % to 30 wt. %, 7 wt. % to 20 wt. %, or 10 wt. % to 15 wt. %. The beginning of life (BOL) mass activity of the electrocatalyst particles 30 is about 200 A/g to 500 A/g, 250 A/g to 400 A/g, or 300 A/g to 350 A/g. The BOL specific activity of the electrocatalyst particles 30 is about 300 µA/cm$^2$ to 1000 µA/cm$^2$, 400 µA/cm$^2$ to 800 µA/cm$^2$, or 500 µA/cm$^2$ to 700 µA/cm$^2$. The end of life (EOL) mass activity of the electrocatalyst particles 30 after 25,000 cycles is about 150 A/g to 350 A/g, 180 A/g to 300 A/g, or 200 A/g to 250 A/g. The EOL specific activity of the electrocatalyst particles 30 in the electrocatalyst particle strands 34 after 25,000 cycles is about 500 µA/cm² to 2000 µA/cm², 800 µA/cm² to 1500 µA/cm², or 1000 µA/cm² to 1200 µA/cm².

Figure 4:
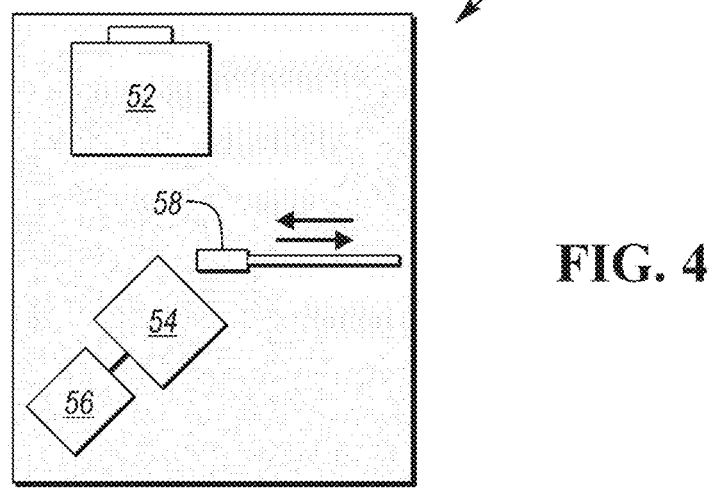
FIG. 4 is a schematic depiction of an example configuration of a vacuum chamber for PVD on fluidized substrate method.
Figure 5A:
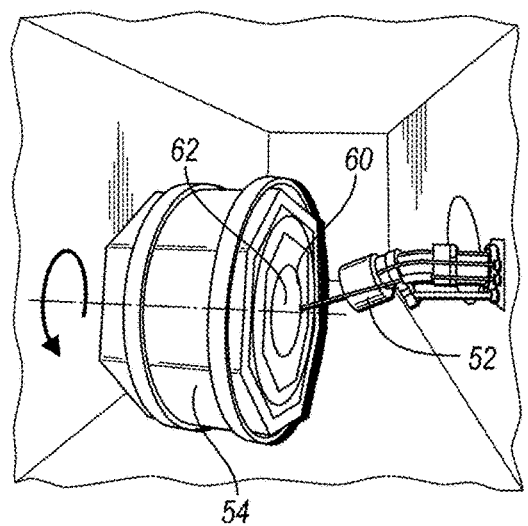
FIG. 5A depicts an example vacuum chamber including a rotating container for PVD on fluidized substrate method of electrocatalyst particles onto a moving substrate.
Figure 5B:
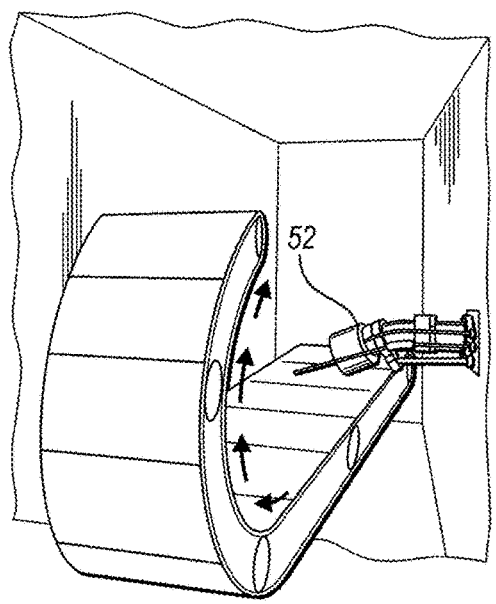
FIG. 5B depicts an alternative example vacuum chamber with a conveyor belt for the PVD on fluidized substrate method.

The present disclosure includes a method of producing the fuel cell ORR cathode catalyst including the chained electrocatalyst particle strands 34 by a modified PVD method. The modified PVD method may be referred to as a PVD on fluidized substrate method or an oblique angle PVD method. The method may include placing the substrate 28 into a vacuum chamber 50. The substrate 28 is in the form of a powder. The method may include providing a ready-made substrate 28, examples of which are named above. The substrate 28 may or may not contain the intermediate layer 32. An example schematic depiction of the vacuum chamber 50 is depicted in FIG. 4. The vacuum chamber 50 includes a cathode target 52 providing the particle deposition, a rotating container 54 for holding the substrate 28, and a motor 56 to power the rotating container 54. The chamber 50 may further include a monitor 58 to analyze thickness of the deposited particles 30. An alternative view of the vacuum chamber 50 is depicted in FIGS. 5A and 5B.

The container 54 may have any shape, size, and/or configuration as long as the container 54 is capable of holding the substrate 28, accepting the electrocatalyst particles 30 being vacuum deposited onto the substrate 28, and rotating. For example, as is depicted in FIG. 5A, the container 54 may be shaped like a cylinder. The cross section of the container 54 may be a circle, an oval, a square, a hexagon, a heptagon, an octagon, a nonagon, a decagon, or a polygon having more than ten sides. The container 54 may be side-oriented. The container 54 may be a fluidization drum. The cylinder 54 may be hollow. Alternatively, the container 54 may include an internal container 60 within the container 54. The container 60 may have any cross-section referenced above. The container 54, 60 may be enclosed except for an aperture 62 through which the electrocatalyst particles 30 are deposited onto the substrate 28 placed within the container 54, 60.

In at least one embodiment, the container 54 and/or the internal container 60 may rotate. The rotation may be clockwise, counterclockwise, or alternate. The method thus includes mixing the substrate 28 within the container 54 or 60 prior to vacuum deposition of the particles 30 onto the substrate 28. A metal or metal oxide may be sputtered onto the substrate 28 to form the intermediate layer 32 prior to the electrocatalyst 30 deposition. Alternatively, the metal or metal oxide may be co-deposited with the electrocatalyst particles 30. Alternatively still, the electrocatalyst particles 30 may be deposited directly onto the substrate 30 free of an intermediate layer 32.

Figure 6:
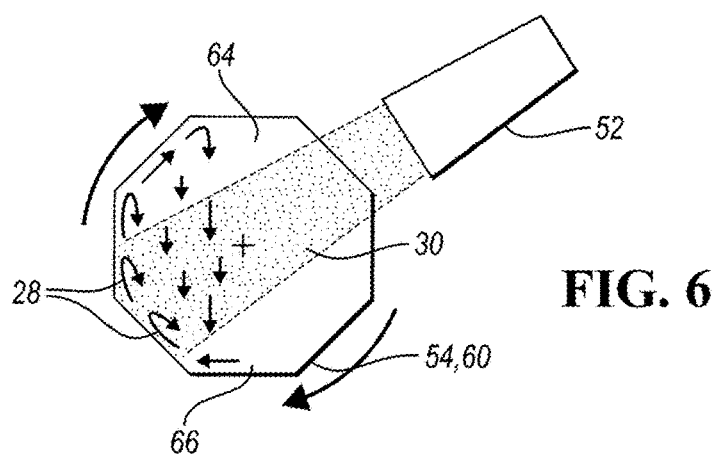
FIG. 6 schematically illustrates direction of the movement of the substrate within the container of FIG. 5A during the PVD on fluidized substrate process.

As a result of the rotation of the container 54, 60, or both, the particles 30, the metal or metal oxide, or both are being deposited onto the substrate 28 while the substrate 28 repeatedly travels toward a top 64 of the container 54, 60 and falls towards the bottom 66 of the container 54, 60 which is schematically depicted in FIG. 6. The arrows depicted in FIG. 6 represent the substrate 28 as the substrate 28 moves within the container 54 in the direction of rotation. The particle 30 deposition is conducted under standard vacuum conditions in an inert atmosphere of Ar, Kr, Xe, the like, or their combination, depending on what type of metal is being deposited. Hydrogen or oxygen may be provided to reduce ($H_2$) or oxidize ($O_2$) the environment. The particles 30, the metal or metal oxide, or both may be deposited under an oblique angle relative to the substrate 28. The angle may be any angle but 90°. The angle may be an acute angle or an obtuse angle. Occasional vacuum deposition of particles under the right angle may occur.

Alternatively, as is depicted in FIG. 5B, the container 54 may be replaced by another mechanism 55 capable of transporting the substrate 28 in an upward manner such that the substrate 28 falls from a height such that the sputtered particles 30 encounter the substrate 28 while the substrate 28 is not stationary. An example mechanism 55 may be one or more conveyor belts. In an example system including the conveyor belts 55, the substrate 28 repeatedly travels toward a top of the conveyor 55 and then falls to a bottom of the conveyor 55 while the particles 30 are being deposited onto the falling substrate 28.

Alternatively, the cathode target 52 may be translated relative to container 54 or the mechanism 55. In such embodiment, the angle under which the particles 30 are being deposited onto the falling substrate 28 may be further adjusted and altered during the deposition process.

Several non-limiting factors such as a speed of rotation or movement, power, duration of the deposition, the type of a substrate, or the like influence the quality of the catalyst. The rotational speed of the container 54, 60 may be about 1 to 15 rpm or more. The speed of the conveyor(s) may be 0.1-20 meters per minute. The container 54 or the mechanism 55 may be powered with about 50 W to 1 kW or more. The duration of deposition depends on the desirable electrocatalyst particle loading, number of monolayers to be formed, and the like. The longer the deposition, the more electrocatalyst particles 30 are deposited.

Without limiting the disclosure to a single theory, it is believed that the combination of the container rotation, container configuration, movement of the mechanism, configuration of the mechanism, and/or particle deposition under an oblique angle may contribute to the elongated shape of the chained electrocatalyst particle strands 34 formed on the substrate 28. Referring back to FIGS. 2A and 3A, FIG. 3A depicts an example substrate 28 and a chained electrocatalyst particle strand 34 being deposited thereon. The arrows in FIGS. 2A and 3A depict directions of the electrocatalyst particle deposition. FIG. 2A depicts a result of a typical right angle PVD particle deposition onto a substrate 28 which is moving in a direction perpendicular to the oncoming deposited particles 30. In FIG. 3A, unlike in FIG. 2A, the particles 30 are being deposited under an oblique angle with respect to the moving substrate 28. The particles in FIG. 3A are not being deposited as an agglomeration but rather as a chain, a string, a line of consecutively interconnected electrocatalytic atoms forming a strand 34.

The resulting catalyst thus contains an optimized arrangement of particles 30 to maximize their catalytic function. The shape of the particle arrangement in the strands 34 allows for a higher EOL mass and specific activity of the electrocatalyst particles 30 than when the particles are arranged onto a stationary substrate into agglomerations. Thus, even at a relatively low electrocatalyst particle loading, the overall activity of the catalyst is higher than an activity of a catalyst formed by other methods.

Additional advantages of the present method include faster processing time compared to solution based methods. Additionally, due to lower metal loading, the cost of the catalyst is lower compared to other methods. Another processing advantage lies in the fact that the method presents a more simple process free of supplementary chemicals which pose environmental issues. As a result, the process is faster, cheaper, and more environmentally friendly.

One or up to about 10 monolayers of the electrocatalyst particles 30 may be deposited as was described above. The substrate 28 coated with the deposited particles and/or monolayers of the particles 30 may be heat-cured after the particle 30 deposition is finished. Optionally, the catalyst-loaded substrate may be impregnated with an ionomer solution such as sulfonated tetrafluoroethylene-based fluoropolymer-copolymer at the same time or prior to stacking of the coated substrate as layers to assemble a fuel cell stack 10. The ionomer solution may be applied by dipping, spraying, printing, brushing, spin coating, or in any other suitable manner, onto the catalyst coated substrate. A PEM 18 may be provided adjacent to the coated substrate. The PEM 18 may be a perfluorsulfonic membrane. The PEM 18 may be about 2 µm to 100 µm thick. The end or bipolar plates 24 may be added. In this manner, a portion of a fuel cell 10 including a plate 24, an anode 12, a membrane 18, a cathode 16, and a plate 24 adjacent to each other may be assembled. The method may include a step of assembling a number of fuel cell units 10 into stacks to provide a fuel cell assembly. A fuel cell may contain about 3 to 400 fuel cell units 10.

EXAMPLES

Six different examples of an ORR catalyst were prepared and their catalytic properties were analyzed. Examples 1-4 included a graphitic carbon substrate which was inserted into a drum within a drum container in a vacuum chamber, arrangement of which is depicted in FIGS. 4 and 5. Example 5 and 6 included a graphitic carbon substrate also containing a metal oxide layer formed from NbOx. In all of the examples 1-6, the substrate was mixed in the rotating side-oriented container such that the substrate repeatedly traveled toward the top of the container and then fell towards the bottom of the container. Particles of platinum were vacuum deposited (sputtered) onto the falling substrate at a speed between 1 and 15 rpm for a duration of 1 minute to 100 hours. The method is referenced in the Table 1 below as a PVD on fluidized substrate method.

The examples 1-6 were compared to two comparative examples C1, C2. C1 and C2 were prepared by a typical wet-chemical process. The results are provided in the Table 1 below. The mass activity, specific activity, and surface area were measured at the beginning of life (BOL) and at the end of life (EOL) after 25,000 cycles. The 12K Pt-stress test relates to 12,000 cycles of a Pt-stress test relating to a cycle run on a rotating disk electrode (RDE) from 0.1 to 1 V square wave 3 s each with 6 s/cycle. Photographs of samples 5 and 6 showing the chained platinum particle strands 34 are provided as FIGS. 3B-3D. As was referenced above, the black color represents the carbon substrate, the gray color represents the NbOx, and the white color represents Pt. In contrast, FIGS. 2B and 2C show platinum agglomerations 26 and lack presence of chained electrocatalyst particle strands 34.

TABLE 1

Comparison of catalytic properties of examples prepared by a PVD on fluidized substrate method and comparative examples prepared by a wet-chemical method.

| Example No. | 1 | 2 | 3 | 4 | 5 | 6 | C1 | C2 |
|---|---|---|---|---|---|---|---|---|
| Composition | C—Pt | C—Pt | C—Pt | C—Pt | C—NbOx—Pt | C—NbOx—Pt | C—Pt | C—Pt |
| Deposition method | PVD on fluidized substrate | PVD on fluidized substrate | PVD on fluidized substrate | PVD on fluidized substrate | PVD on fluidized substrate | PVD on fluidized substrate | wet-chemical | wet-chemical |
| Pt loading (wt. %) | 7 | 7 | 7 | 7 | 10.6 | ~10 | 47 | 47 |
| BOL Mass Activity (A/g) | 280.20 | 373.00 | 323.14 | 370.00 | 231.41 | 282.16 | 157.00 | 165.40 |
| BOL Specific Activity ($\mu A/cm^2$) | 760 | 855 | 787 | 928 | 815 | 624 | 291 | 297 |
| BOL Surface Area ($m^2/g$) | 36.84 | 43.65 | 41.07 | 39.89 | 28.40 | 45.18 | 54.30 | 55.70 |
| Cycle at Intermediate Mass Activity | 321.96 | 362.30 | 213.86 | 213.00 | 183.40 | 226.75 | 134.70 | 128.00 |
| Specific Activity ($\mu A/cm^2$) after 12K Pt-stress test | 1387 | 1260 | 692 | 716 | 838 | 576 | 279 | 300 |
| Surface Area ($m^2/g$) after 12K Pt-stress | 23.21 | 28.77 | 30.89 | 29.89 | 19.18 | 39.37 | 48.33 | 42.00 |
| EOL Mass Activity (A/g) | 288.87 | 326.22 | 152.46 | 188.00 | 156.38 | 204.07 | 119.80 | 97.00 |
| EOL Specific Activity ($\mu A/cm^2$) | 1656 | 1821 | 681 | 673 | 866 | 533 | 248 | 236 |
| EOL Surface Area ($m^2/g$) | 17.44 | 17.91 | 22.38 | 28.02 | 18.06 | 38.28 | 48.20 | 41.43 |

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A fuel cell oxidation reduction reaction catalyst comprising:
a carbon powder substrate;
an amorphous conductive metal oxide intermediate layer on the substrate; and
a plurality of chained electrocatalyst particle strands bound to the layer to form an interconnected network film thereon having a thickness of up to 10 atom monolayers.

2. The catalyst of claim 1, wherein the chained electrocatalyst particle strands comprise platinum.

3. The catalyst of claim 1, wherein an electrocatalyst loading associated with the chained electrocatalyst particle strands is about 5 wt. % to 30 wt. %.

4. The catalyst of claim 3, wherein an end of life mass activity of the electrocatalyst after 25,000 cycles associated with the chained electrocatalyst particle strands is about 150 A/g to 200 A/g.

5. The catalyst of claim 1, wherein the intermediate layer is discontinuous.

6. The catalyst of claim 1, wherein the metal oxide is NbOx.

7. The catalyst of claim 1, wherein the carbon powder substrate comprises graphene flakes.

8. A method of producing a fuel cell oxidation reduction reaction catalyst of claim 1, the method comprising:
within a vacuum chamber,
mixing the carbon powder substrate including the amorphous conductive metal oxide intermediate layer on the substrate in a side-oriented rotating fluidization drum such that the substrate repeatedly travels toward a top of the drum and then falls to a bottom of the drum; and
vacuum depositing electrocatalyst particles onto the falling substrate to form chained electrocatalyst particle strands bound to the intermediate layer on the substrate.

9. The method of claim 8, further comprising rotating the drum at a speed of about 1-15 rpm.

10. The method of claim 8, further comprising vacuum depositing the electrocatalyst particles onto the falling substrate until the chained electrocatalyst particle strands bound to the intermediate layer on the substrate form a layer having a thickness of up to 10 atom monolayers.

11. The catalyst of claim 8, wherein the chained electrocatalyst particle strands comprise platinum.

12. The catalyst of claim 8, wherein an electrocatalyst loading associated with the chained electrocatalyst particle strands is about 5 wt. % to 30 wt. %.

13. The catalyst of claim 8, wherein an end of life mass activity of the electrocatalyst after 25,000 cycles associated with the chained electrocatalyst particle strands is about 150 A/g to 200 A/g.

14. The method of claim 8, wherein the intermediate layer comprises irregularly shaped metal oxide particles having an uneven surface.

15. A method of producing a fuel cell oxidation reduction reaction catalyst of claim 1 comprising:
within a vacuum chamber,
delivering the carbon powder substrate including the amorphous conductive metal oxide intermediate layer on the substrate on a conveyor such that the substrate repeatedly travels toward a top of the conveyor and then falls to a bottom of the conveyor, and
vacuum depositing electrocatalyst particles onto the falling substrate to form chained electrocatalyst particle strands bound to the intermediate layer on the substrate.

16. The catalyst of claim 1, wherein the substrate comprises carbon fiber.

17. The catalyst of claim 1, wherein the amorphous conductive metal oxide intermediate layer is arranged as elongated, curved formations on the substrate.

18. The catalyst of claim 17, wherein the formations have different dimensions, shape, or both.

19. The catalyst of claim 1, wherein the plurality of chained electrocatalyst particle strands are branched strands.

20. The catalyst of claim 1, wherein the plurality of chained electrocatalyst particle strands are elongated strands forming a line.

* * * * *